United States Patent
Chandra Sekhar Rao et al.

(10) Patent No.: US 12,086,746 B2
(45) Date of Patent: Sep. 10, 2024

(54) AUTOMATICALLY DETERMINING ENTERPRISE-RELATED ACTION SEQUENCES USING ARTIFICIAL INTELLIGENCE TECHNIQUES

(71) Applicant: Dell Products L.P., Round Rock, TX (US)

(72) Inventors: Venkata Chandra Sekhar Rao, Bangalore (IN); Jayasekhar Gangarapu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 17/854,987

(22) Filed: Jun. 30, 2022

(65) Prior Publication Data
US 2024/0005241 A1    Jan. 4, 2024

(51) Int. Cl.
G06Q 10/0631    (2023.01)
G06N 3/08       (2023.01)

(52) U.S. Cl.
CPC ......... *G06Q 10/06316* (2013.01); *G06N 3/08* (2013.01)

(58) Field of Classification Search
CPC ..... G06Q 10/10316; G06N 3/08; G06N 3/045
See application file for complete search history.

(56) References Cited

U.S. PATENT DOCUMENTS

| | | | |
|---|---|---|---|
| 8,504,408 B2 * | 8/2013 | Banthia | G06Q 30/02 705/7.29 |
| 9,886,700 B1 * | 2/2018 | Allouche | G06Q 10/0639 |
| 11,068,942 B2 * | 7/2021 | Briancon | G06N 3/088 |
| 11,182,841 B2 * | 11/2021 | Nori | G06N 5/01 |
| 11,416,896 B2 * | 8/2022 | Briancon | G06N 20/20 |
| 11,775,912 B2 * | 10/2023 | Murphy | G06Q 10/06393 705/7.39 |
| 2001/0051913 A1 | 12/2001 | Vashistha et al. | |

(Continued)

FOREIGN PATENT DOCUMENTS

WO    WO-2021192198 A1 *  9/2021  ......... G06Q 30/0202

OTHER PUBLICATIONS

Trailhead.salesforce.com, Identify Target Prospects, https://trailhead.salesforce.com/en/content/learn/modules/moves-management-with-nonprofit-success-pack/identify-target-prospects, accessed Jun. 30, 2022.

(Continued)

*Primary Examiner* — Dylan C White
(74) *Attorney, Agent, or Firm* — Ryan, Mason & Lewis, LLP

(57) ABSTRACT

Methods, apparatus, and processor-readable storage media for automatically determining enterprise-related action sequences using artificial intelligence techniques are provided herein. An example computer-implemented method includes identifying at least one enterprise-related prospect by processing data pertaining to one or more entities; classifying the at least one enterprise-related prospect, based at least in part on estimated prospect conversion time, by using at least a first set of one or more artificial intelligence techniques; determining at least one prospect conversion action sequence for the at least one enterprise-related prospect, based at least in part on the classifying of the at least one enterprise-related prospect, by using at least a second set of one or more artificial intelligence techniques; and performing one or more automated actions based at least in part on the at least one prospect conversion action sequence.

20 Claims, 11 Drawing Sheets

(56) References Cited

U.S. PATENT DOCUMENTS

2007/0219851 A1* 9/2007 Taddei .................. G06Q 30/02
  705/7.13
2019/0164206 A1* 5/2019 Vadlamani ............. G06N 20/00
2023/0334515 A1* 10/2023 Togawa ................ G06Q 30/00

* cited by examiner

FIG. 3

```
def baseline_model():
    model = Sequential()
    model.add(Dense(57, input_dim=38, activation='relu'))
    model.add(Dense(4, activation='softmax'))
    # Compile model
    model.compile (loss='categorical_crossentropy', optimizer='adam', metrics=['accuracy'])

estimator = KerasClassifier(build_fn=baseline_model, epochs=200, batch_size=5, verbose=0)
kfold = KFold(n_splits=10, shuffle=True)
results = cross_val_score(estimator, X, dummy_y, cv=kfold)
print("Accuracy: %.2f%% (%.2f%%)" % (results.mean()*100, results.std()*100))
```

| | OPPORTUNITY | TIME | STAGE | ACTION |
|---|---|---|---|---|
| 0 | OP-3782316 | 43456.60550 | 1 | EMAILED CLIENT |
| 1 | OP-3782316 | 43466.19231 | 1 | EMAILED CLIENT |
| 2 | OP-3782316 | 43471.51592 | 2 | MEETING WITH CLIENT |
| 3 | OP-3782316 | 43479.39509 | 3 | PRESENTED TO CLIENT |
| 4 | OP-3782316 | 43483.32009 | 3 | PRESENTED TO CLIENT |

| events |
|---|
| [ '0-Dummy',<br>'1-Emailed Client',<br>'2-Meeting with Client',<br>'3-Presented to Client',<br>'4-Prepared Custom Demonstration',<br>'5-Prepared POC',<br>'6-Provided Pre-Sales Support',<br>'8-Prepared Commercials',<br>'9-Negotiation Meeting',<br>'7-prepared RFP Responses',<br>'10-Commercials Signed',<br>'11-Post Sales Support'] |

```
series_length = 5
categories = len(events)
time_steps = series_length −1 df.set_index('Opportunity', inplace=True)

history = []
for op in df.index:
    for x in range(len(df['Stage'].loc[op].values)-series_length):
        history.append(df['Stage'].loc[op].values[x:x+series_length])

history [:5]

[ array( [1, 1, 2, 3, 3], dtype=int64),
  array( [1, 2, 3, 3, 3], dtype=int64),
  array( [2, 3, 3, 3, 4], dtype=int64),
  array( [3, 3, 3, 4, 5], dtype=int64),
  array( [3, 3, 4, 5, 5], dtype=int64)]
```

FIG. 8

```
model = Sequential ()

model.add(LSTM(10, activation='relu', return_sequences=True, input_shape=(time_steps,categories)))
model.add(LSTM(10, activation='relu'))
model.add(Dense(categories, activation='softmax'))
model.compile('adam', loss='categorical_crossentropy')

model.summary()
```

⤹ 800

Model : "sequential"

| Layer (type)   | Output Shape    | Param # |
|================|=================|=========|
| lstm (LSTM)    | (None, 4, 10)   | 920     |
|================|=================|=========|
| lstm_1 (LSTM)  | (None, 10)      | 840     |
|================|=================|=========|
| dense (Dense)  | (None, 12)      | 132     |
|================|=================|=========|

FIG. 9

```
model.fit(X_train,y_train, epochs=10)                           ╲ 900
Train on 11323 samples
Epoch 1/10
11323/11323 [==============================] - 3s 257us/sample - loss: 1.9573
Epoch 2/10
11323/11323 [==============================] - 2s 135us/sample - loss: 1.1823
Epoch 3/10
11323/11323 [==============================] - 1s 124us/sample - loss: 1.0492
Epoch 4/10
11323/11323 [==============================] - 2s 133us/sample - loss: 1.0142
```

FIG. 10

```
prediction = model.predict(X_test)

# Next event is
events[np.argmax(prediction[1])]

'8-Prepared Commercials' np.argmax(y_test[1])
7
np.argmax(prediction[1])
7
```

FIG. 11

```
import tensorflow as tf
from tensorflow.keras.metrics import top_k_categorical_accuracy print('Correct event was in top predictions)
print('Correct event was in top two predictions')

Correct event was in top prediction: 0.8879043890377086
Correct event was in top two predictions: 0.9779517824026376
```

AUTOMATICALLY DETERMINING ENTERPRISE-RELATED ACTION SEQUENCES USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for data analysis in such systems.

BACKGROUND

Enterprise systems and personnel routinely perform various action sequences in furtherance of multiple enterprise-related tasks. For example, sales personnel carry out variations on action sequences pertaining to locating prospects and attempting to convert such prospects to enterprise customers. However, with many conventional enterprise management approaches, such types of action sequences are determined manually and/or are static in nature, resulting in significant resource wastage and disadvantageous outcomes.

SUMMARY

Illustrative embodiments of the disclosure provide techniques for automatically determining enterprise-related action sequences using artificial intelligence techniques. An exemplary computer-implemented method includes identifying at least one enterprise-related prospect by processing data pertaining to one or more entities, and classifying the at least one enterprise-related prospect, based at least in part on estimated prospect conversion time, by using at least a first set of one or more artificial intelligence techniques. The method also includes determining at least one prospect conversion action sequence for the at least one enterprise-related prospect, based at least in part on the classifying of the at least one enterprise-related prospect, by using at least a second set of one or more artificial intelligence techniques. Further, the method includes performing one or more automated actions based at least in part on the at least one prospect conversion action sequence.

Illustrative embodiments can provide significant advantages relative to conventional enterprise management approaches. For example, problems associated with resource wastage and disadvantageous outcomes are overcome in one or more embodiments through using artificial intelligence techniques to automatically classify enterprise prospects and determine prospect conversion-related action sequences.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for configuring a model in an illustrative embodiment.

FIG. 5 shows example opportunity pipeline data in an illustrative embodiment.

FIG. 6 shows example event data encoding in an illustrative embodiment.

FIG. 7 shows example pseudocode for determining event data patterns in an illustrative embodiment.

FIG. 8 shows example pseudocode for implementing model configurations in an illustrative embodiment.

FIG. 9 shows example pseudocode for training a model in an illustrative embodiment.

FIG. 10 shows example pseudocode for generating model predictions in an illustrative embodiment.

FIG. 11 shows example pseudocode for determining model accuracy in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
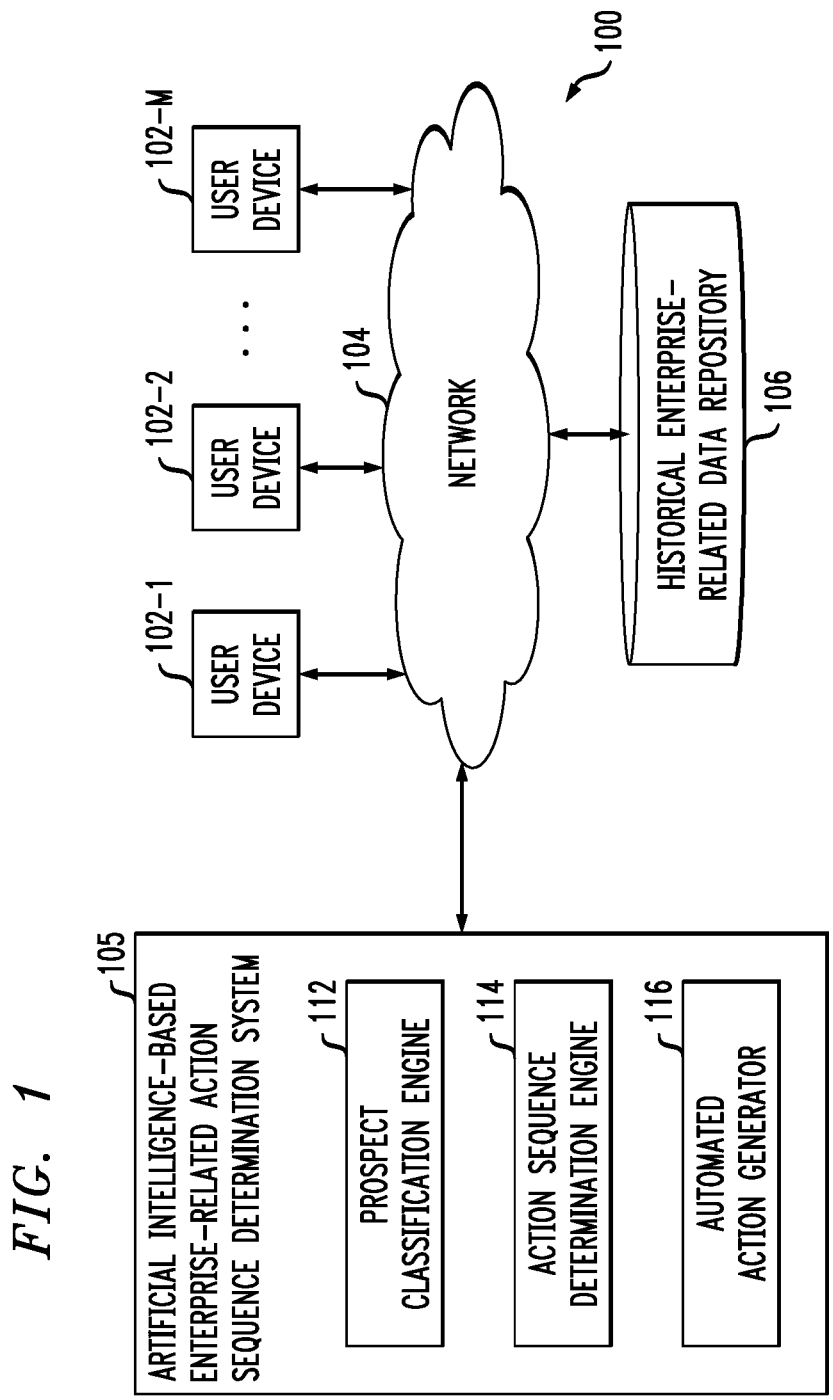
FIG. 1 shows an information processing system configured for automatically determining enterprise-related action sequences using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is artificial intelligence-based enterprise-related action sequence determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human entities (e.g., enterprise customers), hardware entities, software entities or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (TP) or other related communication protocols.

Additionally, artificial intelligence-based enterprise-related action sequence determination system 105 can have an associated historical enterprise-related data repository 106 configured to store data pertaining to enterprise customers and customer conversion processes, which comprise, for example, customer feature data, conversion action-related information, temporal parameter information, etc.

The historical enterprise-related data repository 106 in the present embodiment is implemented using one or more storage systems associated with artificial intelligence-based enterprise-related action sequence determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with artificial intelligence-based enterprise-related action sequence determination system 105 are one or more input-output devices, which illustratively comprise keyboards, displays or other types of input-output devices in any combination. Such input-output devices can be used, for example, to support one or more user interfaces to artificial intelligence-based enterprise-related action sequence determination system 105, as well as to support communication between artificial intelligence-based enterprise-related action sequence determination system 105 and other related systems and devices not explicitly shown.

Additionally, artificial intelligence-based enterprise-related action sequence determination system 105 in the FIG. 1 embodiment is assumed to be implemented using at least one processing device. Each such processing device generally comprises at least one processor and an associated memory, and implements one or more functional modules for controlling certain features of artificial intelligence-based enterprise-related action sequence determination system 105.

More particularly, artificial intelligence-based enterprise-related action sequence determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows artificial intelligence-based enterprise-related action sequence determination system 105 to communicate over the network 104 with the user devices 102, and illustratively comprises one or more conventional transceivers.

The artificial intelligence-based enterprise-related action sequence determination system 105 further comprises prospect classification engine 112, action sequence determination engine 114, and automated action generator 116.

It is to be appreciated that this particular arrangement of elements 112, 114 and 116 illustrated in artificial intelligence-based enterprise-related action sequence determination system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically determining enterprise-related action sequences using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, artificial intelligence-based enterprise-related action sequence determination system 105 and historical enterprise-related data repository 106 can be on and/or part of the same processing platform.

An exemplary process utilizing elements 112, 114 and 116 of an example artificial intelligence-based enterprise-related action sequence determination system 105 in computer network 100 will be described in more detail with reference to the flow diagram of FIG. 12.

Accordingly, at least one embodiment includes generating and implementing artificial intelligence techniques to identify enterprise prospects based at least in part on proactive approaches by learning existing customer patterns, identifying one or more specific customer prospects, and determining at least one sequence of particular actions to perform to convert at least a portion of the one or more specific customer prospects to enterprise customers. As used herein, the term "prospect" is intended to be broadly construed to encompass a company, enterprise, or organization, including a fully or partially automated entity.

As further detailed herein, one or more embodiments include comparing one or more features of identified enterprise prospects with one or more features of converted enterprise customers, and preemptively determining the probability of prospect conversion (e.g., before attempting any conversion-related actions). Further, at least one embodiment includes dynamically determining and recommending at least one particular sequence of actions in connection with attempting to convert the prospect into an enterprise customer.

By way merely of example, data and/or features to be considered, in one or more embodiments, in identifying enterprise prospects can include customer employee size, status as decision maker, enterprise role, growth of previous enterprise engagement and/or purchases, location-related information, customer preferences, customer service(s), product features, delivery-related information, amount of time taken for conversion, etc. Accordingly, in such an embodiment, one or more artificial intelligence techniques can be trained on such data and/or features associated with existing enterprise customers. Such artificial intelligence techniques can then be used to process data and/or features associated with at least one individual (e.g., an individual who is not an existing enterprise customer and may qualify as a prospect) to determine and generate a particular sequence of actions for converting the individual into an enterprise customer, along with an estimation of the time required to carry out the conversion.

At least one embodiment includes implementing and/or training a fully connected neural network classifier model to determine and/or identify one or more patterns in customer data and/or prospect data. In such an embodiment, the fully connected neural network classifier model can be tested on data related to one or more enterprise prospects to determine and/or predict an expected amount of time needed to convert each such enterprise prospect into an enterprise customer. Based at least in part on the expected amount of time for conversion, such an embodiment can include classifying the prospect (e.g., a good prospect to be pursued, a bad prospect to be ignored, etc.). Once classified, a sequence of events can be determined and/or generated for a given prospect by processing historical action-related data and data pertaining to the prospect using a long short-term memory (LSTM) model. Such a sequence of actions can be determined and/or generated with respect to one or more temporal parameters based at least in part on processing, for example, historical data related to previous conversion processes and pipeline data (e.g., data pertaining to sequences of activities occurring during conversion processes). For example, in such an embodiment, an LSTM model can be trained as per the historical data related to previous conversion processes and pipeline data, as a current action (in the generated sequence) is dependent on what action(s) has/have been carried out before and what response(s) has/have resulted from such action(s).

Figure 2:
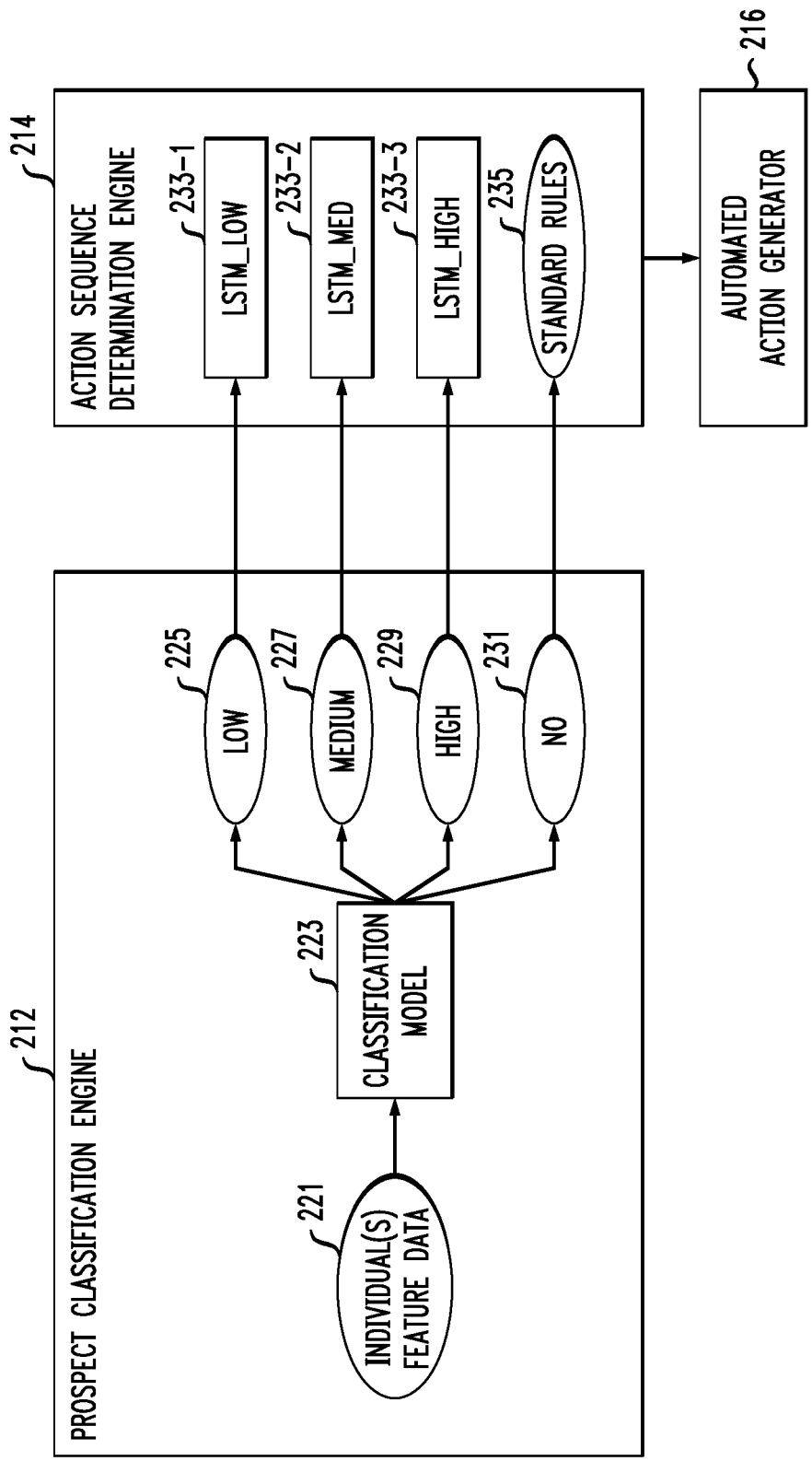
FIG. 2 shows an example workflow in an illustrative embodiment.

FIG. 2 shows an example workflow in an illustrative embodiment. By way of illustration, FIG. 2 depicts prospect classification engine 212, action sequence determination engine 214, and automated action generator 216. In one or more embodiments, prospect classification engine 212 can include a fully connected neural network-based prospect persona classification model, which classifies individuals as one of multiple categories of prospect based at least in part on a determined and/or estimated amount of time needed for converting the individual into an enterprise customer.

As depicted in FIG. 2, feature data 221 of one or more given individuals are processed by classification model 223 (e.g., classification model 223 determines how one or more portions of the feature data impact lead times for conversion) to classify each individual as requiring a low amount of time for conversion 225, a medium amount of time for conversion 227, a high amount of time for conversion 229, or as not likely to be converted 231.

As depicted in FIG. 2, the classifications generated by prospect classification engine 212 are then processed by action sequence determination engine 214, which recommends, for each classified prospect, one or more sequences of activities to be implemented to increase the likelihood of conversion. As illustrated, in one or more embodiments, action sequence determination engine 214 can include multiple LSTM models (e.g., LSTM_LOW 233-1, LSTM_MEDIUM 233-2, and LSTM_HIGH 233-3) which correspond to at least a portion of the classifications generated by prospect classification engine 212. Also, action sequence determination engine 214, which can include a set of standard rules 235 (e.g., rules pertaining to reaching out to a prospect, explaining a product or service to a prospect, following-up with a prospect, etc.), processes data generated by prospect classification engine 212 associated with individuals classified as not likely to be converted 231.

Additionally, as depicted in FIG. 2, the recommended sequence(s) of actions determined by action sequence determination engine 214 are output to and/or processed by automated action generator 216, which performs and/or initiates one or more automated actions. By way of example, such actions can include outputting a notification containing at least a portion of the recommended sequence(s) of actions to one or more users, initiating the first action in one or more of the recommended sequence(s), and training and/or fine-tuning, based at least in part on feedback generated in response to the recommended sequence(s), at least one of classification model 223, LSTM_LOW 233-1, LSTM_MEDIUM 233-2, and LSTM_HIGH 233-3.

FIG. 3 shows example pseudocode for configuring a model in an illustrative embodiment. In this embodiment, example pseudocode 300 is executed by or under the control of at least one processing system and/or device. For example, the example pseudocode 300 may be viewed as comprising a portion of a software implementation of at least part of artificial intelligence-based enterprise-related action sequence determination system 105 of the FIG. 1 embodiment.

The example pseudocode 300 illustrates defining a baseline model which can include 38 inputs, 57 hidden nodes, and four outputs. Additionally, as depicted in FIG. 3, such a model can include a rectified linear unit (ReLU) activation function and a softmax activation function, as well as categorical_crossentropy as a loss function, adaptive moment estimation (ADAM) as the optimization algorithm, and "accuracy" as the metric. Also, example pseudocode 300 illustrates use of an estimator, which is a deep learning classification model to classify prospect-to-customer conversion time, k-fold techniques to shuffle training and testing data to understand multiple features, and results which include the comparison between predicted class values versus actual class values.

It is to be appreciated that this particular example pseudocode shows just one example implementation of configuring a model, and alternative implementations of the process can be used in other embodiments.

As detailed herein, once individuals are classified into one of multiple prospect categories (e.g., based at least in part on how much time would be required to convert the individual into an enterprise customer), at least one embodiment includes creating at least one sequence of actions related to converting the prospect using one or more LSTM models and historical conversion process data. Accordingly, such an embodiment can include recommending the next best action in a conversion process for each classified prospect.

By way merely of example, in one or more embodiments, such actions can include sending at least one email to the prospect, meeting the prospect, learning one or more priorities, making a presentation to the prospect, preparing a custom demonstration for the prospect, providing pre-sales support to the prospect, preparing one or more commercials, negotiating one or more terms related to prospect engagement, providing post-sales support, etc. In at least one embodiment, each activity is to be performed with respect to one or more temporal parameters (e.g., in a particular sequence), and two or more activities can be interdependent, to be performed based on the response of one action after another action for successful conversion of the prospect to an enterprise customer.

By way of example, in one or more embodiments, prospect classification can be based at least in part on historical conversion-related data. In such an embodiment, at least one artificial intelligence model (e.g., a neural network) is trained using such historical data (e.g., actions have been carried out in connection with various prospects and the responses to such actions). Additionally, for actions that are not dependent and/or influential on a final conversion-related outcome, such an embodiment includes automatically identifying and ignoring such actions in determining prospect classifications. Further, if the model predicted a relatively low amount of time for conversion for a given individual, then this individual may be considered and/or classified as a good prospect determining a corresponding action sequence (e.g., using one or more LSTM models) can be initiated.

Figure 4:
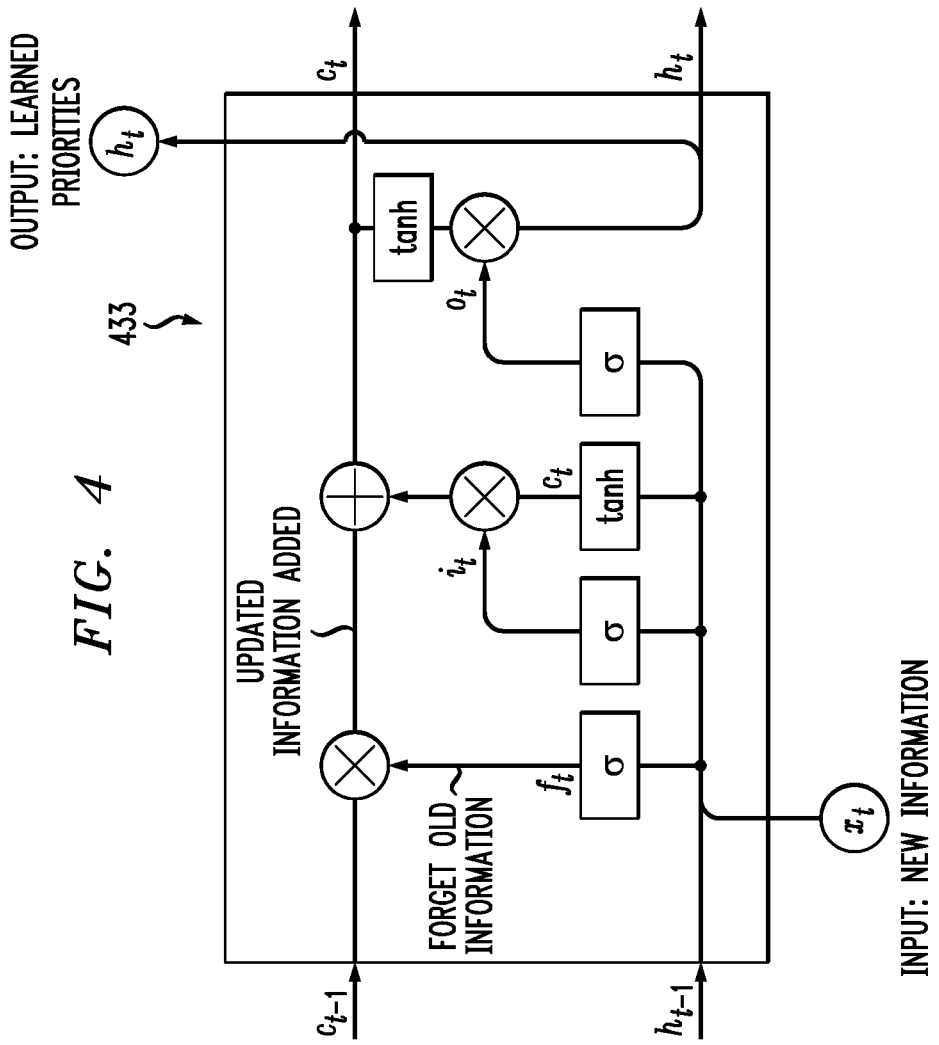
FIG. 4 shows example model architecture in an illustrative embodiment.

FIG. 4 shows example model architecture in an illustrative embodiment. Specifically, FIG. 4 depicts example architecture of an LSTM model 433. As illustrated as part of LSTM model 433, $x_t$ represents the input state, at time step t, including new information (e.g., communication data between the individual and the enterprise), $h_{t-1}$ represents the previous output state (e.g., a received response) at time step t−1, $c_{t-1}$ represents a cell state which remembers an entire prior sequence (including, for example, email(s) sent, reminder email(s), response(s), etc.) until time step t−1, $f_t$ represents an identification of which information (e.g., reminder email(s) sent, etc., which are not dependent and/or influential on the outcome) should be forgotten in $c_{t-1}$, and $i_t$ represents current state and t−1 hidden state information and saves such data to cell state $c_t$ (i.e., the updated cell state). Additionally, $h_t$ represents an output state (including, for example, one or more learned enterprise priorities) to be passed to the next time step (t+1). Also, σ represents a sigmoid gate, which can, for example, provide intermediate output state $o_t$ information to a tanh activation function (represented as tanh in FIG. 4). A sigmoid gate outputs a value between 0 and 1, which describes how much information should be passed. A value of 0 indicates that nothing should be passed and/or get through, and a value of 1 indicates that everything should be passed and/or get through. The tanh activation function will map values between −1 and 1, similar to the sigmoid gate.

At least one embodiment includes training at least one model using previous customer conversion pipeline activities to determine and/or identify one or more patterns. During new customer activities, such a trained model can identify the expected outcome for each action, and based at least in part on the identified expected outcome, such an embodiment can determine one or more enterprise opportunities related to converting the given prospect to an enterprise customer.

FIG. 5 shows example opportunity pipeline data in an illustrative embodiment. By way of illustration, FIG. 5 depicts a table 500 detailing a sequence of actions (e.g., emailed client, meeting with client, and presented to client) with corresponding timestamps, opportunity identification values, and stage designations. In table 500, opportunity refers to a generalized number to contact the prospect or customer, and stage refers to a sequence number of activities performed related to the opportunity.

FIG. 6 shows example event data encoding in an illustrative embodiment. By way of illustration, FIG. 6 depicts a listing of activities 600, each encoded to a numeric format for model perspective and/or compliance. For example, the activity "emailed client" is encoded to a value of 1, the activity "meeting with client" is encoded to a value of 2, the activity "presented to client" is encoded to a value of 3, the activity "prepared custom demonstration" is encoded to a value of 4, etc.

FIG. 7 shows example pseudocode for determining event data patterns in an illustrative embodiment. In this embodiment, example pseudocode 700 is executed by or under the control of at least one processing system and/or device. For example, the example pseudocode 700 may be viewed as comprising a portion of a software implementation of at least part of artificial intelligence-based enterprise-related action sequence determination system 105 of the FIG. 1 embodiment.

The example pseudocode 700 illustrates using a series length (also referred to as a lag) of five to learn and/or understand one or more patterns and dependencies on one or more given events. Additionally, example pseudocode 700 depicts making a sequence of actions with a window size of five, such that the first four serve as input and the fifth serves as output, facilitating understanding and/or learning dependency information until the last four actions are happening.

It is to be appreciated that this particular example pseudocode shows just one example implementation of determining event data patterns, and alternative implementations of the process can be used in other embodiments.

FIG. 8 shows example pseudocode for implementing model configurations in an illustrative embodiment. In this embodiment, example pseudocode 800 is executed by or under the control of at least one processing system and/or device. For example, the example pseudocode 800 may be viewed as comprising a portion of a software implementation of at least part of artificial intelligence-based enterprise-related action sequence determination system 105 of the FIG. 1 embodiment.

The example pseudocode 800 illustrates implementing an LSTM model with ReLU and softmax activation functions, as well as an ADAM optimization function and a categorical_crossentropy loss function. Also, in configuring the LSTM model, pseudocode 800 depicts LSTM as having an input shape of (4, 12), indicating that there are 12 possible unique events, and in each row, 4 activities are taken as training and the fifth activity is designated as the target event to train the model. More specifically, as detailed in example pseudocode 800, the LSTM model includes an initial layer with a ReLU activation function with an input data shape, a second layer with another ReLU activation function to understand and/or learn one or more patterns, and a third layer which includes a dense layer to predict the possible action out of 12 combinations.

It is to be appreciated that this particular example pseudocode shows just one example implementation of model configurations, and alternative implementations of the process can be used in other embodiments.

FIG. 9 shows example pseudocode for training a model in an illustrative embodiment. In this embodiment, example pseudocode 900 is executed by or under the control of at least one processing system and/or device. For example, the example pseudocode 900 may be viewed as comprising a portion of a software implementation of at least part of artificial intelligence-based enterprise-related action sequence determination system 105 of the FIG. 1 embodiment.

The example pseudocode 900 illustrates training a model on 11,323 data samples across a given number of epochs (e.g., four of ten epochs). Example pseudocode 900 also depicts that each epoch in such training takes a given amount of time (e.g., one second, two seconds, three seconds, etc.) and generates a given loss value.

It is to be appreciated that this particular example pseudocode shows just one example implementation of training a model, and alternative implementations of the process can be used in other embodiments.

FIG. 10 shows example pseudocode for generating model predictions in an illustrative embodiment. In this embodiment, example pseudocode 1000 is executed by or under the control of at least one processing system and/or device. For example, the example pseudocode 1000 may be viewed as comprising a portion of a software implementation of at least part of artificial intelligence-based enterprise-related action sequence determination system 105 of the FIG. 1 embodiment.

The example pseudocode 1000 illustrates generating a prediction to test the next best action (also referred to as the "next event") using the model versus test data. In other words, an example embodiment, such as detailed in connection with example pseudocode 1000, includes predicting, using the model, what is the next best activity to perform, and comparing that predicted activity with the actual activity carried out.

It is to be appreciated that this particular example pseudocode shows just one example implementation of generating model predictions, and alternative implementations of the process can be used in other embodiments.

FIG. 11 shows example pseudocode for determining model accuracy in an illustrative embodiment. In this embodiment, example pseudocode 1100 is executed by or under the control of at least one processing system and/or device. For example, the example pseudocode 1100 may be viewed as comprising a portion of a software implementation of at least part of artificial intelligence-based enterprise-related action sequence determination system 105 of the FIG. 1 embodiment.

The example pseudocode 1100 illustrates determining accuracy values within a given number of predictions (e.g., top prediction, top two predictions, etc.) to understand the next best among the predictions. Such accuracy determinations are carried out using a top_k_categorical_accuracy function from tensorflow.keras.metrics.

It is to be appreciated that this particular example pseudocode shows just one example implementation of determining model accuracy, and alternative implementations of the process can be used in other embodiments.

Figure 12:
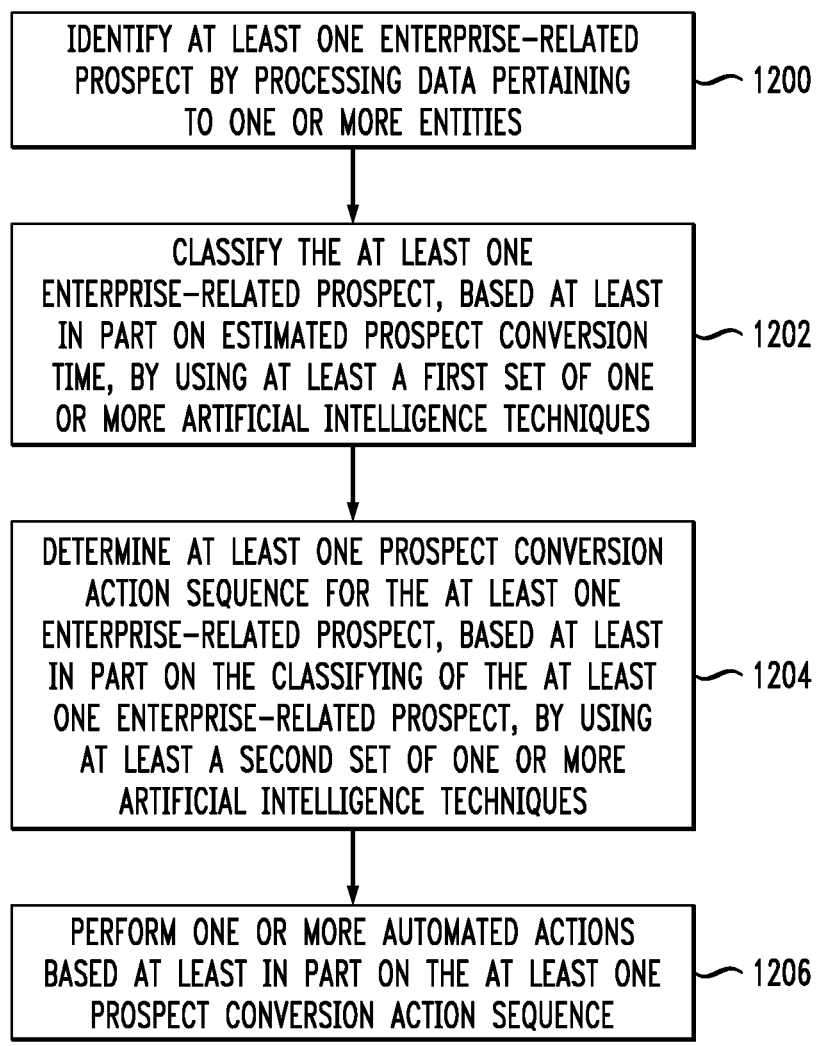
FIG. 12 is a flow diagram of a process for automatically determining enterprise-related action sequences using artificial intelligence techniques in an illustrative embodiment.

FIG. 12 is a flow diagram of a process for automatically determining enterprise-related action sequences using artificial intelligence techniques in an illustrative embodiment. It is to be understood that this particular process is only an example, and additional or alternative processes can be carried out in other embodiments.

In this embodiment, the process includes steps 1200 through 1206. These steps are assumed to be performed by artificial intelligence-based enterprise-related action sequence determination system 105 utilizing elements 112, 114 and 116.

Step 1200 includes identifying at least one enterprise-related prospect by processing data pertaining to one or more entities. In one or more embodiments, identifying at least one enterprise-related prospect includes processing one or more of entity size-related data, entity responsibility-related data, entity role-related data, historical transaction-related data, location-related data, entity preference-related data, enterprise service-related data, enterprise product-related data, delivery-related data, and conversion-related data.

Step 1202 includes classifying the at least one enterprise-related prospect, based at least in part on estimated prospect conversion time, by using at least a first set of one or more artificial intelligence techniques. In at least one embodiment, classifying the at least one enterprise-related prospect includes determining one or more patterns in at least a portion of the data pertaining to the one or more entities using at least one fully connected neural network classifier model. In such an embodiment, determining one or more patterns in at least a portion of the data pertaining to the one or more entities using at least one fully connected neural network classifier model includes predicting an expected amount of time needed to convert the at least one enterprise-related prospect into at least one enterprise customer based at least in part on the one or more determined patterns. Also, in such an embodiment, classifying the at least one enterprise-related prospect can include classifying the at least one enterprise-related prospect on a basis of likelihood of conversion based at least in part on the expected amount of time needed to convert the at least one enterprise-related prospect into at least one enterprise customer.

Step 1204 includes determining at least one prospect conversion action sequence for the at least one enterprise-related prospect, based at least in part on the classifying of the at least one enterprise-related prospect, by using at least a second set of one or more artificial intelligence techniques. In one or more embodiments, determining at least one prospect conversion action sequence includes determining at least one prospect conversion-related sequence of enterprise-related actions by processing historical action-related data and data pertaining to the at least one classified enterprise-related prospect using at least one LSTM model. In such an embodiment, determining at least one prospect conversion-related sequence of enterprise-related actions can include determining at least one prospect conversion-related sequence of enterprise-related actions in accordance with at least one of multiple temporal parameters.

Additionally or alternatively, determining at least one prospect conversion-related sequence of enterprise-related actions can include at least one of the following: in response to a first classification of the at least one enterprise-related prospect, selecting a first LSTM model for use in processing historical action-related data and data pertaining to the at least one classified enterprise-related prospect; in response to a second classification of the at least one enterprise-related prospect, selecting a second LSTM model for use in processing historical action-related data and data pertaining to the at least one classified enterprise-related prospect; and in response to a third classification of the at least one enterprise-related prospect, selecting a third LSTM model for use in processing historical action-related data and data pertaining to the at least one classified enterprise-related prospect.

Step 1206 includes performing one or more automated actions based at least in part on the at least one prospect conversion action sequence. In at least one embodiment, performing one or more automated actions includes automatically initiating, using one or more enterprise-related systems, at least a portion of the at least one prospect conversion action sequence. Additionally or alternatively, performing one or more automated actions can include generating and outputting, to one or more enterprise systems, a notification detailing the at least one prospect conversion action sequence. Also, in one or more embodiments, performing one or more automated actions includes automatically training, using feedback pertaining to the at least one prospect conversion action sequence, at least one of the first set of one or more artificial intelligence techniques and the second set of one or more artificial intelligence techniques.

The techniques depicted in FIG. 12 can also include training at least one of the first set of one or more artificial intelligence techniques and the second set of one or more artificial intelligence techniques using data pertaining to multiple existing enterprise customers. Additionally, in at least one embodiment, the first set of one or more artificial intelligence techniques and the second set of one or more artificial intelligence techniques comprise overlap of at least one artificial intelligence technique.

Accordingly, the particular processing operations and other functionality described in conjunction with the flow diagram of FIG. 12 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine enterprise-related action sequences using artificial intelligence techniques. These and other embodiments can effectively overcome problems associated with resource wastage and disadvantageous outcomes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
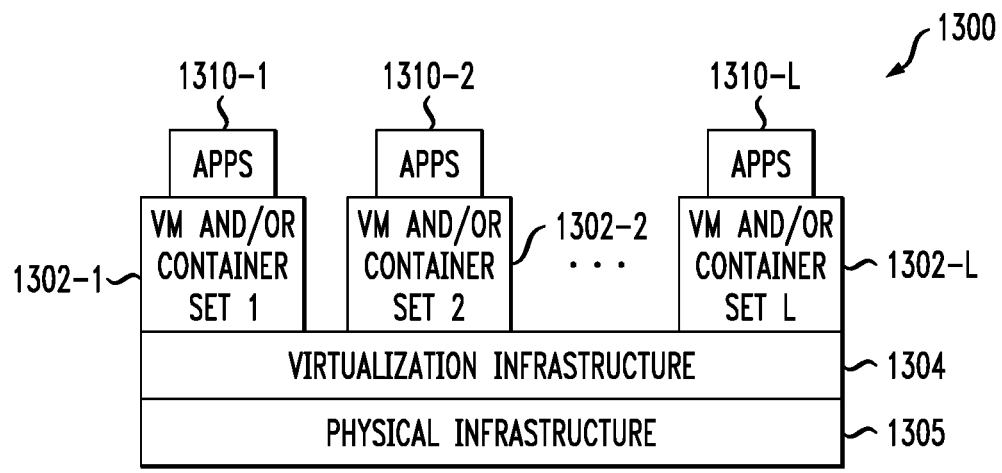
FIGS. 13 and 14 show examples of processing platforms that may be utilized to implement at least a portion of an information processing system in illustrative embodiments.
Figure 14:
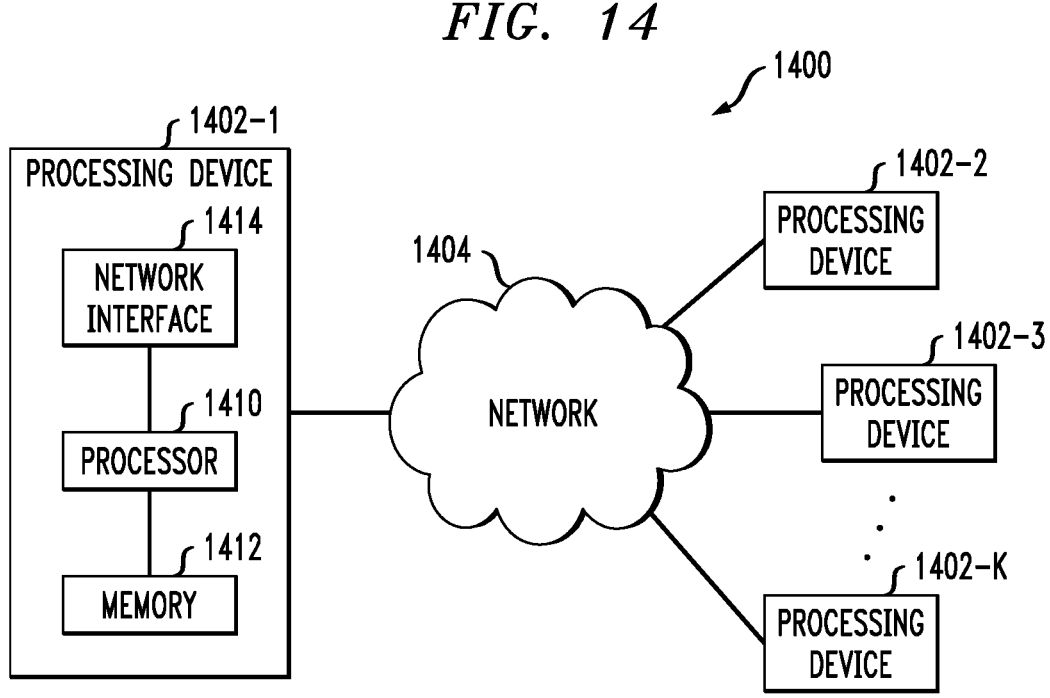

FIG. 13 shows an example processing platform comprising cloud infrastructure 1300. The cloud infrastructure 1300 comprises a combination of physical and virtual processing resources that are utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure.

The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 comprise respective VMs, respective sets of one or more containers, or respective sets of one or more containers running in VMs. In some implementations of the FIG. 13 embodiment, the VMs/container sets 1302 comprise respective VMs implemented using virtualization infrastructure 1304 that comprises at least one hypervisor.

A hypervisor platform may be used to implement a hypervisor within the virtualization infrastructure 1304, wherein the hypervisor platform has an associated virtual infrastructure management system. The underlying physical machines comprise one or more information processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1402-1 in the processing platform 1400 comprises a processor 1410 coupled to a memory 1412.

The processor 1410 comprises a microprocessor, a CPU, a GPU, a TPU, a microcontroller, an ASIC, a FPGA or other type of processing circuitry, as well as portions or combinations of such circuitry elements.

The memory 1412 comprises random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
identifying at least one enterprise-related prospect by processing data pertaining to one or more entities;
classifying the at least one enterprise-related prospect, based at least in part on estimated prospect conversion time, by using at least a first set of one or more artificial intelligence techniques;
determining at least one prospect conversion action sequence for the at least one enterprise-related prospect, based at least in part on the classifying of the at least one enterprise-related prospect, by using at least a second set of one or more artificial intelligence techniques; and
performing one or more automated actions based at least in part on the at least one prospect conversion action sequence, wherein performing one or more automated actions comprises automatically tuning, using feedback pertaining to the at least one prospect conversion action sequence, at least one of the first set of one or more artificial intelligence techniques and the second set of one or more artificial intelligence techniques;
wherein the method is performed by at least one processing device comprising a processor coupled to a memory.

2. The computer-implemented method of claim 1, wherein classifying the at least one enterprise-related prospect comprises determining one or more patterns in at least a portion of the data pertaining to the one or more entities using at least one fully connected neural network classifier model.

3. The computer-implemented method of claim 2, wherein determining one or more patterns in at least a portion of the data pertaining to the one or more entities using at least one fully connected neural network classifier model comprises predicting an expected amount of time needed to convert the at least one enterprise-related prospect into at least one enterprise customer based at least in part on the one or more determined patterns.

4. The computer-implemented method of claim 3, wherein classifying the at least one enterprise-related prospect comprises classifying the at least one enterprise-related prospect on a basis of likelihood of conversion based at least in part on the expected amount of time needed to convert the at least one enterprise-related prospect into at least one enterprise customer.

5. The computer-implemented method of claim 1, wherein determining at least one prospect conversion action sequence comprises determining at least one prospect conversion-related sequence of enterprise-related actions by processing historical action-related data and data pertaining to the at least one classified enterprise-related prospect using at least one long short-term memory model.

6. The computer-implemented method of claim 5, wherein determining at least one prospect conversion-related sequence of enterprise-related actions comprises determining at least one prospect conversion-related sequence of enterprise-related actions in accordance with at least one of multiple temporal parameters.

7. The computer-implemented method of claim 5, wherein determining at least one prospect conversion-related sequence of enterprise-related actions comprises at least one of:

in response to a first classification of the at least one enterprise-related prospect, selecting a first long short-term memory model for use in processing the historical action-related data and the data pertaining to the at least one classified enterprise-related prospect;
in response to a second classification of the at least one enterprise-related prospect, selecting a second long short-term memory model for use in processing the historical action-related data and the data pertaining to the at least one classified enterprise-related prospect; and
in response to a third classification of the at least one enterprise-related prospect, selecting a third long short-term memory model for use in processing the historical action-related data and the data pertaining to the at least one classified enterprise-related prospect.

8. The computer-implemented method of claim 1, wherein performing one or more automated actions comprises automatically initiating, using one or more enterprise-related systems, at least a portion of the at least one prospect conversion action sequence.

9. The computer-implemented method of claim 1, wherein performing one or more automated actions comprises generating and outputting, to one or more enterprise systems, a notification detailing the at least one prospect conversion action sequence.

10. The computer-implemented method of claim 1, wherein identifying at least one enterprise-related prospect comprises processing one or more of entity size-related data, entity responsibility-related data, entity role-related data, historical transaction-related data, location-related data, entity preference-related data, enterprise service-related data, enterprise product-related data, delivery-related data, and conversion-related data.

11. The computer-implemented method of claim 1, further comprising:
training at least one of the first set of one or more artificial intelligence techniques and the second set of one or more artificial intelligence techniques using data pertaining to multiple existing enterprise customers.

12. The computer-implemented method of claim 1, wherein the first set of one or more artificial intelligence techniques and the second set of one or more artificial intelligence techniques comprise overlap of at least one artificial intelligence technique.

13. A non-transitory processor-readable storage medium having stored therein program code of one or more software programs, wherein the program code when executed by at least one processing device causes the at least one processing device:
to identify at least one enterprise-related prospect by processing data pertaining to one or more entities;
to classify the at least one enterprise-related prospect, based at least in part on estimated prospect conversion time, by using at least a first set of one or more artificial intelligence techniques;
to determine at least one prospect conversion action sequence for the at least one enterprise-related prospect, based at least in part on the classifying of the at least one enterprise-related prospect, by using at least a second set of one or more artificial intelligence techniques; and
to perform one or more automated actions based at least in part on the at least one prospect conversion action sequence, wherein performing one or more automated actions comprises automatically tuning, using feedback pertaining to the at least one prospect conversion action sequence, at least one of the first set of one or more artificial intelligence techniques and the second set of one or more artificial intelligence techniques.

14. The non-transitory processor-readable storage medium of claim 13, wherein classifying the at least one enterprise-related prospect comprises determining one or more patterns in at least a portion of the data pertaining to the one or more entities using at least one fully connected neural network classifier model.

15. The non-transitory processor-readable storage medium of claim 13, wherein determining at least one prospect conversion action sequence comprises determining at least one prospect conversion-related sequence of enterprise-related actions by processing historical action-related data and data pertaining to the at least one classified enterprise-related prospect using at least one long short-term memory model.

16. The non-transitory processor-readable storage medium of claim 13, wherein performing one or more automated actions comprises automatically initiating, using one or more enterprise-related systems, at least a portion of the at least one prospect conversion action sequence.

17. An apparatus comprising:
at least one processing device comprising a processor coupled to a memory;
the at least one processing device being configured:
to identify at least one enterprise-related prospect by processing data pertaining to one or more entities;
to classify the at least one enterprise-related prospect, based at least in part on estimated prospect conversion time, by using at least a first set of one or more artificial intelligence techniques;
to determine at least one prospect conversion action sequence for the at least one enterprise-related prospect, based at least in part on the classifying of the at least one enterprise-related prospect, by using at least a second set of one or more artificial intelligence techniques; and
to perform one or more automated actions based at least in part on the at least one prospect conversion action sequence, wherein performing one or more automated actions comprises automatically tuning, using feedback pertaining to the at least one prospect conversion action sequence, at least one of the first set of one or more artificial intelligence techniques and the second set of one or more artificial intelligence techniques.

18. The apparatus of claim 17, wherein classifying the at least one enterprise-related prospect comprises determining one or more patterns in at least a portion of the data pertaining to the one or more entities using at least one fully connected neural network classifier model.

19. The apparatus of claim 17, wherein determining at least one prospect conversion action sequence comprises determining at least one prospect conversion-related sequence of enterprise-related actions by processing historical action-related data and data pertaining to the at least one classified enterprise-related prospect using at least one long short-term memory model.

20. The apparatus of claim 17, wherein performing one or more automated actions comprises automatically initiating, using one or more enterprise-related systems, at least a portion of the at least one prospect conversion action sequence.

* * * * *